United States Patent [19]
Ichikawa et al.

[11] Patent Number: 5,929,189
[45] Date of Patent: *Jul. 27, 1999

[54] GOLF BALL

[75] Inventors: Yasushi Ichikawa; Shunichi Kashiwagi, both of Chichibu, Japan

[73] Assignee: Bridgestone Sports Co., Ltd., Tokyo, Japan

[*] Notice: This patent is subject to a terminal disclaimer.

[21] Appl. No.: 08/833,037

[22] Filed: Apr. 3, 1997

Related U.S. Application Data

[60] Provisional application No. 60/017,281, May 13, 1996.

[30] Foreign Application Priority Data

Apr. 3, 1996 [JP] Japan ................................ 8-106317

[51] Int. Cl.⁶ .................................................. A63B 37/12
[52] U.S. Cl. .............................. 528/76; 528/83; 473/371; 473/374; 473/377; 473/378
[58] Field of Search ..................................... 473/371, 374, 473/377, 378; 528/76, 83

[56] References Cited

U.S. PATENT DOCUMENTS

| | | |
|---|---|---|
| 3,663,514 | 5/1972 | Campbell . |
| 4,062,825 | 12/1977 | Watabe . |
| 4,123,061 | 10/1978 | Dusbiber ................................ 528/63 |
| 4,248,432 | 2/1981 | Hewitt .................................... 528/83 |
| 4,858,924 | 8/1989 | Saito ..................................... 473/373 |
| 5,497,996 | 3/1996 | Cadorniga ............................ 473/378 |
| 5,792,008 | 8/1998 | Kakiuchi ............................... 473/365 |
| 5,800,286 | 9/1998 | Kakiuchi ............................... 473/365 |

*Primary Examiner*—David Buttner
*Attorney, Agent, or Firm*—Sughrue, Mion, Zinn, Macpeak & Seas, PLLC

[57] ABSTRACT

A golf ball comprises a core and a cover enclosing the core. The cover resin is composed mainly of a thermoplastic polyurethane elastomer having an aliphatic diisocyanate component and exhibiting a tan δ peak temperature of not higher than −20° C. in viscoelasticity measurement.

11 Claims, No Drawings

GOLF BALL

CROSS REFERENCE TO RELATED APPLICATIONS

This application is an application filed under 35 U.S.C. § 111(a) claiming benefit pursuant to 35 U.S.C. § 119(e) (i) of the filing date of the Provisional Application 60/017,281, filed May 13, 1996, pursuant to 35 U.S.C. § 111(b).

BACKGROUND OF THE INVENTION

1. Field of the Invention

This invention relates to a golf ball comprising a core and a cover. More particularly, it relates to a golf ball wherein a thermoplastic polyurethane elastomer comprised of an aliphatic diisocyanate and having specific viscoelasticity is used as the cover whereby the ball offers an improved initial velocity (or repulsion), an increased carry, a pleasant hitting feel, controllability, improved scuff resistance upon iron shots, little discoloring of cover surface, and good moldability.

2. Prior Art

With respect to the resin component of golf ball covers, ionomer resins in the form of ethylene/(meth)acrylic acid copolymers have heretofore been widely used and accepted as the cover stock for two-piece solid golf balls and some wound golf balls because of their hitting durability and cut resistance.

Ionomer resins of this type, however, generally have drawbacks including difficulty to impart spin as desired upon iron shots and poor controllability since they provide a hard hitting feel as compared with balata rubber conventionally used as the cover stock and have a higher hardness than balata rubber.

For an improvement in this regard, it was proposed (in U.S. Pat. No. 4,884,814 and JP-A 308577/1989) to use a soft/hard ionomer blend of a relatively soft ionomer resin in the form of an ethylene/(meth)acrylic acid/(meth)acrylate terpolymer with a certain amount of an ionomer resin in the form of an ethylene-(meth)acrylic acid copolymer having a specific spectrum of physical properties as a golf ball cover. It was also proposed (in JP-A 277208/1993) to use at least two metal salts of ethylene/unsaturated carboxylic acid/unsaturated carboxylate terpolymers having low flexural modulus as the cover.

These proposals are effective techniques for significantly improving the hard hitting feel and poor control which are problems of prior art golf balls using an ionomer resin in the form of an ethylene/(meth)acrylic acid copolymer as the cover.

The golf ball covers according to the above-referred proposals, however, suffer from the following problems. Namely, the fact that the cover is soft and receptive to spin upon iron shots indicates an increased frictional force between the club face and the cover. As a consequence, balls using a hard core like two-piece solid golf balls often give rise to the phenomenon that the ball surface is scuffed or scraped upon iron shots because the cover surface can be rubbed off by furrows in the iron club face.

Moreover, the ionomer resin covers experience a drastic drop of restitution as their hardness lowers. The covers themselves are reduced in restitution, leading to a substantial drop of restitution of balls as a whole.

Then, many attempts were proposed to use thermosetting polyurethane elastomers having a relatively low price, good feel and scuff resistance as a substitute for balata rubber or ionomer resin (U.S. Pat. Nos. 4,123,061, 3,989,568, and 5,334,673).

Although the above-proposed thermosetting polyurethane elastomers are improved in scuff resistance which is a problem of softened blends of ionomer resins, they require a complex operation of effecting curing reaction after injection of stock material, for example. More efforts must still be made to enable mass scale production. Since thermosetting polyurethane elastomers including only aliphatic isocyanate have a slow rate of curing reaction, it is preferred to partially use aromatic isocyanate to accelerate the reaction. The use of aromatic isocyanate, however, causes the cover to yellow with the lapse of time. Even when white enamel paint is coated to the outside for concealing, the ball cannot keep its outer color tone unchanged as the polyurethane cover yellows.

On the other hand, many investigations were made on the covers using thermoplastic polyurethane elastomers (U.S. Pat. Nos. 3,395,109, 4,248,432, and 4,442,282). Although these thermoplastic polyurethane elastomers are effective for improving scuff resistance upon iron shots and moldability, they are still unsatisfactory at present with respect to hitting feel, control, and initial velocity (repulsion). There is a desire to develop a golf ball having better performance and higher quality.

SUMMARY OF THE INVENTION

The present invention has been made under the above-mentioned circumstances, and its object is to provide a high performance, high quality golf ball which is improved in all factors of hitting feel, control, initial velocity (repulsion), scuff resistance upon iron shots, discoloring, and moldability.

Making extensive investigations to attain the above object, the inventors have found in connection with a golf ball comprising a core and a cover that when a thermoplastic polyurethane elastomer comprised of an aliphatic diisocyanate and having optimum viscoelasticity is used as a main resin component of the cover, a golf ball having a core encased in this cover exerts excellent performance in all factors of hitting feel, control, initial velocity (repulsion), scuff resistance upon iron shots, discoloring, and moldability.

More particularly, as a result of extensive investigations on an optimum resin component of cover stock for a golf ball comprising a core and a cover, the inventors attempted to use as a cover base material a thermoplastic polyurethane elastomer comprised of an aliphatic diisocyanate wherein the peak temperature of tan δ (loss elastic modulus/storage elastic modulus) as found in viscoelasticity measurement is not higher than −20° C. and found that this material possesses excellent properties as the golf ball cover stock as demonstrated by a minimized reduction of initial velocity.

In the golf ball comprising a high repulsion solid core having a certain specific gravity and hardness enclosed with a cover stock composed of the above-mentioned resin component, the repulsion of the core cooperates with the repulsion of the cover itself to improve the initial velocity (repulsion), achieving a marked increase of carry. Additionally, the thermoplastic polyurethane elastomer of the cover stock has enough scuff resistance to effectively prevent the ball from being fluffed or scraped at the surface and uses an aliphatic diisocyanate so that the cover may not yellow with the lapse of time. Because of the thermoplastic resin, injection molding can be employed as a method for encasing a core in a cover, leading to improved moldability and mass-scale productivity. Moreover, the golf ball of the above-mentioned cover-core combination is a high performance, high quality ball which offers a pleasant feel and control upon hitting, effectively solving the outstanding problems. Based on this finding, the present invention is completed.

Accordingly, the present invention provides a golf ball comprising a core and a cover enclosing the core, wherein said cover resin is composed mainly of a thermoplastic polyurethane elastomer having an aliphatic diisocyanate component and exhibiting a tan δ peak temperature of not higher than −20° C. in viscoelasticity measurement.

DETAILED DESCRIPTION OF THE INVENTION

The present invention is described below in further detail.

The golf ball of the invention includes a core and a cover wherein the cover resin is composed mainly of a thermoplastic polyurethane elastomer having an aliphatic diisocyanate component and exhibiting a tan δ peak temperature of not higher than −20° C. in viscoelasticity measurement.

The tan δ peak temperature used herein is one index indicating viscoelastic properties of a cover resin. The tan δ peak temperature is measured by the following procedure. A specimen of 1.0 mm thick, 12.0–12.7 mm wide, and 30–35 mm long is used. It is measured for loss elastic modulus and storage elastic modulus at a frequency of 10 Hz over a temperature range between −100° C. and +80° C. using a viscoelasticity spectrometer Dynamic Analyzer RDAII manufactured by Rheometrics Company. A value of tan δ is calculated by dividing the loss elastic modulus by the storage elastic modulus. The temperature at which the value of tan δ peaks is the tan δ peak temperature.

The tan δ peak temperature found in viscoelasticity measurement of the thermoplastic polyurethane elastomer as mentioned above is not higher than −20° C., preferably −20° C. to −50° C. If the tan δ peak temperature is higher than −20° C., the resulting cover material is short of repulsion so that a ball encased with the cover material may be low in repulsion and hence, initial velocity, leading to a shorter carry.

With respect to its molecular structure, the thermoplastic polyurethane elastomer having an aliphatic diisocyanate and exhibiting a tan δ peak temperature of not higher than −20° C. in the above-mentioned viscoelasticity measurement includes soft segments formed of a high molecular weight polyol compound and hard segments formed of a monomolecular chain extender and an aliphatic diisocyanate.

The high molecular weight polyol compound used herein is not critical and may be selected from polyester polyols, polyether polyols, copolyester polyols, and polycarbonate polyols. The polyester polyols include polycaprolactone glycol, poly(ethylene-1,4-adipate) glycol, and poly (butylene-1,4-adipate) glycol; the copolyester polyols include poly(diethylene glycol adipate) glycol; the polycarbonate polyols include (hexanediol-1,6-carbonate) glycol; and the polyether polyols include polyoxytetramethylene glycol. Their number average molecular weight preferably ranges from about 600 to about 5,000, more preferably from 1,000 to 3,000.

Aliphatic diisocyanates are used as the diisocyanate when the yellowing resistance of the cover is considered. Examples are hexamethylene diisocyanate (HDI), 2,2,4-(2,4,4)-trimethylhexamethylene diisocyanate (TMDI), lysine diisocyanate (LDI), etc., with the hexamethylene diisocyanate (HDI) being especially preferred from the point of view of compatibility with other resins to be blended therewith.

The chain extender is not critical and conventional polyhydric alcohols and amines may be used. Examples include 1,4-butylene glycol, 1,2-ethylene glycol, 1,3-propylene glycol, 1,6-hexyl glycol, 1,3-propylene glycol, dicyclohexylmethane diamine (hydrogenated MDA), isophorone diamine (IPDA), etc.

For the thermoplastic polyurethane elastomer having an aliphatic diisocyanate and exhibiting a tan δ peak temperature of not higher than −20° C. in viscoelasticity measurement, there may be used commercially available products, for example, trade name: Pandex T-R3080 and T-7890 by Dai-Nihon Ink Chemical Industry K.K.

It is understood that another thermoplastic resin may be blended with the thermoplastic polyurethane elastomer in order to enhance the function and benefits of the invention. Examples of the thermoplastic resin used herein include polyamide elastomers, polyester elastomers, ionomers, styrene block elastomers, hydrogenated butadiene, ethylene-vinyl acetate copolymers (EVA), polycarbonates, polyacrylates, and polyamides.

In addition to the above-mentioned resin component, various additives such as pigments, dispersants, antioxidants, UV absorbers, and mold release agents may be added to the cover material in conventional amounts, if desired.

It is noted that the cover hardness is not critical although it is preferably in the range of 35 to 60, especially 38 to 58 on Shore D hardness scale. With a Shore D hardness of less than 35, more spin would be imparted by short iron shots to such an extent that even skilled players encounter difficulty to control. On the other hand, with a Shore D hardness of more than 60, less spin would be imparted upon iron shots and the hitting feel would be unpleasant for skilled players.

It is noted that the gage and specific gravity of the cover are not critical and may be selected in a wide range. The cover gage may be 1 to 4 mm, especially 1.2 to 3 mm and the specific gravity may be 1.0 to 1.35, especially 1.1 to 1.3.

Next, the core to be encased in the above-mentioned cover is not critical and may be either a wound core or a solid core. The solid core is preferred because the molding of the cover stock by injection molding is superior in moldability and mass productivity. In this regard, two-piece solid golf balls having a single layer structure core, three-piece solid golf balls having a two-layer structure core, and multi-piece solid golf balls having a multiple-layer structure solid core are contemplated.

In this regard, the solid core (single layer, dual-layer or multi-layer structure) preferably has a specific gravity of 0.98 to 1.13, especially 1.0 to 1.1. If the core specific gravity is less than 0.98, a ball finally produced to a diameter of 42.67 to 42.9 mm would have a too light product weight outside the Rules of Golf so that it is readily affected by wind. On the other hand, if the core specific gravity is more than 1.13, a ball finally produced to a diameter of 42.67 to 42.9 mm would have a too heavy product weight outside the Rules of Golf so that it is less repulsive, failing to travel a satisfactory carry.

It is noted that the diameter, weight, and hardness of the core are not critical and may be selected in a wide range. The diameter may be 34.67 to 40.90 mm, especially 36.67 to 40.50 mm, the weight may be 21.4 to 40.5 grams, especially 26.0 to 39.45 grams, and the hardness may be 2.0 to 4.2 mm, especially 2.4 to 3.8 mm as expressed by a distortion under application of a load of 100 kg.

The above-mentioned solid core is preferably formed using an elastomer based on poly(cis-1,4-butadiene). Except for this, the core can be formed using other well-known materials by a well-known method.

The method of enclosing the core with the cover and forming dimples in the cover is not critical. Like conventional ionomer resin covers, a method of injection molding a cover stock directly on the core, or a method involving the steps of preforming a pair of hemispherical half cups from the cover resin, enclosing the core with the half cups, and applying heat and pressure at 140° to 180° C. for 2 to 10 minutes may be employed.

The thus obtained golf ball as molded is thereafter subject to finishing steps such as buffing, stamping and paint coating on its surface.

There has been described the construction of the golf ball according to the invention while it preferably has a hardness of 2.2 to 4 mm, especially 2.5 to 3.5 mm as expressed by a distortion under application of a load of 100 kg.

It is understood that golf games are played under the common Rules of Golf over the world. It is, of course, prerequisite that with respect to weight, diameter, symmetry, and initial velocity, the golf ball should have, according to the Rules of Golf by the Japan Golf Association, Appendix III, the Ball, (a), (b), (c), and (d), a weight of not greater than 45.93 grams, a diameter of not less than 42.67 mm, and an initial velocity properly tailored so as to be not greater than 76.2 m/sec. when measured on apparatus approved by the R & A (a maximum tolerance of 2% (77.7 m/sec.) will be allowed and the temperature of the ball when tested shall be 23±1° C.).

As described above, the golf ball according to the invention has a core enclosed with a cover based on a thermoplastic polyurethane elastomer having an aliphatic diisocyanate and optimum viscoelasticity whereby the ball has advantages including an improved initial velocity (or repulsion), an increased carry, a pleasant hitting feel, controllability, no yellowing of cover surface with the lapse of time, least scuffing damage upon iron club shots, moldability, and mass productivity.

EXAMPLE

Examples of the invention are given below together with Comparative Examples by way of illustration and not by way of limitation.

Examples and Comparative Examples

Four solid cores A through D were molded by kneading a core-forming composition as shown in Table 1 and vulcanizing it in a mold at 155° C. for 20 minutes. The solid cores were measured for diameter, specific gravity, hardness, and initial velocity, with the results also shown in Table 1. It is noted that all the amounts of the respective components blended in Table 1 are expressed by parts by weight.

TABLE 1

|  | A | B | C | D | E |
|---|---|---|---|---|---|
| Polybutadiene rubber*1 | 100 | 100 | 100 | 100 | 100 |
| Zinc acrylate | 21.5 | 21.5 | 27.5 | 17.0 | 25.0 |
| Zinc oxide | 13.0 | 26.3 | 10.0 | 15.0 | 8.0 |
| Dicumyl peroxide | 1.0 | 1.0 | 1.0 | 1.0 | 1.0 |
| Peptizer*2 | 1.0 | 1.0 | 1.0 | 1.0 | 1.0 |
| Core properties |  |  |  |  |  |
| Specific gravity | 1.08 | 1.16 | 1.08 | 1.08 | 1.06 |
| Diameter (mm) | 38.5 | 38.5 | 38.5 | 38.5 | 34.9 |
| Weight (g) | 32.3 | 34.7 | 32.3 | 32.3 | 23.6 |
| Hardness*3 (mm) | 3.41 | 3.41 | 2.50 | 4.10 | 2.70 |
| Hytrel 4767*4 enclosing the core | No | No | No | No | Yes |
| Intermediate layer |  |  |  |  |  |
| Diameter (mm) | — | — | — | — | 38.5 |
| Weight (g) | — | — | — | — | 32.3 |
| Hardness*3 (mm) | — | — | — | — | 2.80 |

*1 trade name BR01 (manufactured by Nihon Synthetic Rubber K.K.)
*2 trade name Renacit 4 (Bayer A.G.)
*3 a distortion under a load of 100 kg
*4 trade name Hytrel 4767 (manufactured by Toray-duPont K.K.), surface hardness = 47 on Shore D, specific gravity 1.15

Cover compositions were prepared by kneading 100 parts by weight of a resin as shown in Table 2 with 5 parts by weight of titanium white and 0.3 part by weight of magnesium stearate in a twin-screw extruder.

The cover compositions were measured for hardness (Shore D), specific gravity, and tan δ peak temperature. The results are also shown in Table 2. The measurement of tan δ peak temperature was carried out by the above-mentioned procedure.

Two-piece solid golf balls of Examples 1–5 and Comparative Examples 1–4 were prepared by encasing the solid cores A, B, C, D, and E (core E further had an intermediate layer) in the cover compositions in a combination as shown in Table 2 through injection molding.

The resulting golf balls were examined for various properties by the following tests. The results are also shown in Table 2.
Golf ball hardness
  A distortion (mm) of a ball under a load of 100 kg was measured. Higher values indicate softer balls.
Initial velocity
  An initial velocity was measured according to the measurement procedure of USGA (R&A).
Flight test
  Using a swing robot machine and No. 1 wood (driver), a ball was actually hit at a head speed of 45 m/sec. (HS45) to measure a carry and a total distance.
Hitting feel
  With No. 1 wood (or driver), an actual hitting test was performed by a panel of five professional golfers and five skilled amateur golfers. The criterion for evaluation is given below.
  ⊚: very good
  O: good
  X: bad
Controllability
  With a pitching wedge, an actual hitting test was performed by a panel of five professional golfers and five skilled amateur golfers. The criterion for evaluation is given below.
  ⊚: very good
  O: good X: bad Scuff resistance upon iron shots A ball was kept at a temperature of 23° C. A pitching wedge was mounted on a swing robot machine. The ball was normally hit at three positions by the pitching wedge at a head speed of 33 m/sec. The three hit areas were visually observed. Evaluation was made according to the following criterion.

5: no change on the ball surface or very slight club face dent
4: substantial club face dent, but no fluff from the cover surface
3: fluffed, markedly scrapped surface
2: fluffed, cracked surface
1: dimples rubbed off Yellowing (ΔYI)

Mercury lamp: Using a G/B accelerated discoloration tester FM-1 manufactured by Suga Tester K.K. and a fade-ometer mercury lamp H400-F manufactured by Toshiba K.K., a ball was illuminated for 24 hours.

Heat resistance: A ball was kept in a constant temperature tank at 65° C. for 48 hours.

The ball was measured for ΔYI before and after each test according to JIS K7103, using a multi-light source spectrophotometer MSC-IS-2DH manufactured by Suga Tester K.K. Higher values indicate more yellowing.

TABLE 2

|  | Example |  |  |  |  | Comparative Example |  |  |  |
|---|---|---|---|---|---|---|---|---|---|
|  | 1 | 2 | 3 | 4 | 5 | 1 | 2 | 3 | 4 |
| Cover resin composition (pbw) | | | | | | | | | |
| Pandex T-7890*[5] | 100 | — | 100 | 100 | 100 | — | — | — | — |
| Pandex T-R3080*[6] | — | 100 | — | — | — | — | — | — | — |
| Pandex T-1190*[7] | — | — | — | — | — | 100 | — | — | — |
| Pandex TA-2798*[8] | — | — | — | — | — | — | 100 | — | — |
| Surlyn 8120*[9] | — | — | — | — | — | — | — | 50 | 50 |
| Himilan 1706*[10] | — | — | — | — | — | — | — | — | 50 |
| Himilan AM7316*[11] | — | — | — | — | — | — | — | 50 | — |
| Titanium white | 5 | 5 | 5 | 5 | 5 | 5 | 5 | 5 | 5 |
| Magnesium stearate | 0.3 | 0.3 | 0.3 | 0.3 | 0.3 | 0.3 | 0.3 | 0.3 | 0.3 |
| Cover resin properties | | | | | | | | | |
| Gage (mm) | 2.10 | 2.10 | 2.10 | 2.10 | 2.10 | 2.10 | 2.10 | 2.10 | 2.10 |
| Hardness (Shore D) | 41 | 38 | 41 | 41 | 41 | 40 | 53 | 42 | 56 |
| Specific gravity | 1.18 | 1.18 | 1.18 | 1.18 | 1.18 | 1.21 | 1.21 | 0.97 | 0.97 |
| tanδ peak temperature | −34 | −38 | −34 | −34 | −34 | −15 | −10 | — | — |
| Core type | A | A | D | C | E | A | A | B | B |
| Ball properties | | | | | | | | | |
| Diameter (mm) | 42.70 | 42.70 | 42.70 | 42.70 | 42.70 | 42.70 | 42.70 | 42.70 | 42.70 |
| Weight (g) | 45.20 | 45.20 | 45.20 | 45.20 | 45.10 | 45.20 | 45.20 | 45.20 | 45.20 |
| Hardness (mm) | 3.34 | 3.41 | 4.00 | 2.70 | 2.90 | 3.35 | 3.15 | 3.22 | 3.13 |
| Initial velocity (m/s) | 77.08 | 77.05 | 76.65 | 77.48 | 77.01 | 76.03 | 75.59 | 76.60 | 76.70 |
| Flight test (HS45) | | | | | | | | | |
| Carry (m) | 215.0 | 215.2 | 213.0 | 216.5 | 215.0 | 211.1 | 209.2 | 212.2 | 213.6 |
| Total (m) | 226.0 | 225.0 | 223.0 | 228.7 | 227.0 | 220.5 | 219.2 | 222.0 | 222.9 |
| Hitting feel | ◉ | ◉ | ◉ | ◉ | ◉ | ◉ | ○ | ◉ | ○ |
| Controllability | ◉ | ◉ | ◉ | ◉ | ◉ | ◉ | ○ | ◉ | ○ |
| Yellowing (ΔYI) | | | | | | | | | |
| Mercury lamp | 3.0 | 3.0 | 3.0 | 3.0 | 3.0 | 7.5 | 7.2 | 4.0 | 4.0 |
| Heat resistance | 0.7 | 0.7 | 0.7 | 0.7 | 0.7 | 3.5 | 3.3 | 0.8 | 0.8 |
| Scuff resistance upon iron shots | 5 | 5 | 5 | 5 | 5 | 4 | 4 | 2 | 2 |

*[5]non-yellowing thermoplastic polyurethane elastomer of aliphatic isocyanate/adipate polyol manufactured by Dai-Nihon Ink Chemical Industry K.K., surface hardness = 91 (JIS-A), 41 (Shore D)
*[6]non-yellowing thermoplastic polyurethane elastomer of aliphatic isocyanate/adipate polyol manufactured by Dai-Nihon Ink Chemical Industry K.K., surface hardness = 86 (JIS-A), 38 (Shore D)
*[7]thermoplastic polyurethane elastomer of aromatic isocyanate/adipate polyol manufactured by Dai-Nihon Ink Chemical Industry K.K., surface hardness = 92 (JIS-A), 43 (Shore D)
*[8]thermoplastic polyurethane elastomer of aromatic isocyanate/lactone polyol manufactured by Dai-Nihon Ink Chemical Industry K.K., surface hardness = 98 (JIS-A), 53 (Shore D)
*[9]ethylene/methacrylic acid/methacrylate terpolymer ionomer manufactured by duPont, acid content about 10% by weight, ion species Na, ester content about 20% by weight, surface hardness = 45 (Shore D)
*[10]ethylene/methacrylic acid copolymer ionomer manufactured by Mitsui-duPont Poly-Chemical K.K., acid content about 15% by weight, ion species Zn, degree of ionization about 60 mol%, surface hardness = 62 (Shore D)
*[11]ethylene/methacrylic acid/methacrylate terpolymer ionomer manufactured by Mitsui-duPont Poly-Chemical K.K., ion species Zn, surface hardness = 34 (Shore D)

It is evident from the data of Table 2 that the balls of Comparative Examples 1 and 2 yellow seriously because the cover resin is based on a thermoplastic polyurethane elastomer using aromatic isocyanate and fail to provide a satisfactory initial velocity and flying distance because of lack of optimum viscoelasticity. The balls of Comparative Examples 3 and 4 using ionomer resin covers have poor scuff resistance upon iron shots.

In contrast, the balls of Examples 1 to 5 have superior controllability, increased initial velocity (repulsion), increased flying distance, less yellowing, and good scuff resistance upon iron shots.

We claim:

1. A golf ball comprising a core and a cover enclosing the core, wherein said cover resin is composed mainly of a thermoplastic polyurethane elastomer having an aliphatic diisocyanate component selected from the group consisting of hexamethylene diisocyanate. 2, 2, 4 or 2, 4, 4-trimethylhexamethylene diisocyanate and lysine diisocyanate and exhibiting a tan δ peak temperature of not higher than −20° C. in viscoelasticity measurement.

2. The golf ball of claim 1 wherein said core is a solid core formed of a cis-1,4-polybutadiene and has a specific gravity of 0.98 to 1.13.

3. The golf ball of claim 1 wherein said solid core is a multi-layer solid core and has a specific gravity of 0.98 to 1.13.

4. The golf ball of claim 1 wherein the golf ball has a diameter of 42.67 to 42.9 mm and a distortion of 2.2 to 4 mm under a load of 100 kg.

5. The golf ball of claim 1, wherein said solid core has a diameter in the range of 34.67 to 40.90 mm and, weight in the range of 21.4 to 40.5 grams and a hardness of 2.0 to 4.2 mm under an applied load of 100 kg.

6. The golf ball of claim 1, wherein said cover has a Shore D hardness of 35 to 60.

7. The golf ball of claim 1, wherein said cover has a Shore D hardness of 38 to 58.

8. The golf ball of claim 1, wherein said cover has a thickness in the range of 1 to 4 mm.

9. The golf ball of claim 1, wherein said cover has a specific gravity in the range of 1.0 to 1.35.

10. The golf ball of claim 1, wherein said cover has a thickness in the range of 1.2 to 3 mm and a specific gravity in the range of 1.1 to 1.3.

11. The golf ball of claim 1, wherein said golf ball has a distortion of 2.5 to 3.5 mm under an applied load of 100 kg.

* * * * *